US010394544B2

(12) United States Patent
Kelly et al.

(10) Patent No.: US 10,394,544 B2
(45) Date of Patent: Aug. 27, 2019

(54) ELECTRONIC UPDATE HANDLING BASED ON USER ACTIVITY

(71) Applicant: International Business Machines Corporation, Armonk, NY (US)

(72) Inventors: Alexander J. Kelly, Romsey (GB); Alexander D. S. Mirski-Fitton, Winchester (GB); Edwin P. J. Moffatt, Winchester (GB); Ross B. Pavitt, Headley (GB)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 15/447,276

(22) Filed: Mar. 2, 2017

(65) Prior Publication Data

US 2018/0253294 A1 Sep. 6, 2018

(51) Int. Cl.
| | |
|---|---|
| *G06F 9/44* | (2018.01) |
| *G06F 8/65* | (2018.01) |
| *H04L 29/08* | (2006.01) |
| *H04W 4/021* | (2018.01) |
| *H04W 4/02* | (2018.01) |
| *H04W 4/21* | (2018.01) |
| *H04W 4/50* | (2018.01) |
| *G06F 9/4401* | (2018.01) |

(52) U.S. Cl.
CPC ............... *G06F 8/65* (2013.01); *H04L 67/18* (2013.01); *H04L 67/22* (2013.01); *H04L 67/325* (2013.01); *H04L 67/34* (2013.01); *H04W 4/02* (2013.01); *H04W 4/021* (2013.01); *H04W 4/21* (2018.02); *H04W 4/50* (2018.02); *G06F 9/4418* (2013.01)

(58) Field of Classification Search
CPC ........................................................ G06F 8/65
USPC ........................................................ 717/171
See application file for complete search history.

(56) References Cited

U.S. PATENT DOCUMENTS

| | | | |
|---|---|---|---|
| 8,065,428 B2 | 11/2011 | Cromer et al. | |
| 8,676,657 B2* | 3/2014 | Fenton | .................... H04L 67/02 705/26.1 |
| 8,862,709 B2* | 10/2014 | Cromer | ................. G06F 9/4416 709/222 |
| 8,930,820 B1* | 1/2015 | Elwell | .................. G06Q 10/109 705/319 |
| 9,262,438 B2* | 2/2016 | Agrawal | ........... G06F 17/30241 |
| 9,639,346 B2* | 5/2017 | Tuukkanen | ............... G06F 8/65 |
| 9,881,427 B2* | 1/2018 | Barajas Gonzalez | .. G07C 5/006 |
| 9,942,850 B2* | 4/2018 | Wang | ................ H04W 52/0251 |

(Continued)

*Primary Examiner* — Evral E Bodden
(74) *Attorney, Agent, or Firm* — William H. Hartwell; Hunter E. Webb; Keohane & D'Alessandro PLLC

(57) ABSTRACT

Aspects of the present invention provide an approach for performing a computer program update on a target computer. In an embodiment, a target computer having a location, a user, a computer program, and a computer program update is determined. An expected install duration for installing the computer program update is determined. A social media service associated with the user is monitored. A user location is detected from the social media service and an update time window is estimated based on the user location and the distance that the user is away from the target computer location. A decision is made whether to install the computer program update based on the update time window and the expected install duration.

18 Claims, 6 Drawing Sheets

(56) References Cited

U.S. PATENT DOCUMENTS

| | | | |
|---|---|---|---|
| 2006/0101400 A1* | 5/2006 | Capek | G06F 9/4843 |
| | | | 717/120 |
| 2006/0190938 A1 | 8/2006 | Capek et al. | |
| 2013/0318516 A1* | 11/2013 | Knapton | G06F 8/654 |
| | | | 717/168 |
| 2014/0297817 A1 | 10/2014 | Thikkalveettil et al. | |

\* cited by examiner

Update Agent 200

Target Computer Engine 206

Install Duration Engine 208

Social Media Engine 210

Update Window Engine 212

Installation Engine 214

Computer Program Update Method 300

FIGURE 2

ELECTRONIC UPDATE HANDLING BASED ON USER ACTIVITY

TECHNICAL FIELD

In general, embodiments of the present invention relate to electronic update handing based on user activity. More specifically, embodiments of the invention are drawn to timing the applying of updates to computer software using social media information to minimize disruption for a user.

BACKGROUND

In the information technology of today, computer software is frequently updated by the provider to fix bugs, provide increased utility, improve security, and/or for a host of other reasons. However, while it is desirable for a user of a computer to keep its software up to date, updates can interrupt what the user is doing on the computer.

SUMMARY

In general, aspects of the present invention provide an approach for performing a computer program update on a target computer. In an embodiment, a target computer having a location, a user, a computer program, and a computer program update is determined. An expected install duration for installing the computer program update is determined. A social media service associated with the user is monitored. A user location is detected from the social media service and an update time window is estimated based on the user location and the distance that the user is away from the target computer location. A decision is made whether to install the computer program update based on the update time window and the expected install duration.

In an aspect of the invention there is provided a system for performing a computer program update on a target computer comprising: a target computer engine for determining a target computer having a location, a user, a computer program, and a computer program update; an install duration window engine for determining an expected install duration for installing the computer program update; a social media engine for monitoring a social media service associated with the user and for detecting a user location from a social media post on the social media service; an update window engine for estimating an update time window, based on the user location, that the user is away from the target computer location; and an installation engine for installing the computer program update based on the update time window the expected install duration.

In another aspect of the invention there is provided a method for performing a computer program update on a target computer comprising: determining a target computer having a location, a user, a computer program, and a computer program update; determining an expected install duration for installing the computer program update; monitoring a social media service associated with the user; detecting a user location from the social media service; estimating an update time window, based on the user location, that the user is away from the target computer location; and deciding to install the computer program update based on the update time window and the expected install duration.

In a further aspect of the invention there is provided a computer code product for performing a computer program update on a target computer, said computer code product stored on a computer readable medium and loadable into the internal memory of a digital computer, comprising software code portions, when said computer code product is run on a computer, for performing the following steps: determining a target computer having a location, a user, a computer program, and a computer program update; determining an expected install duration for installing the computer program update; monitoring a social media service associated with the user; detecting a user location from the social media service; estimating an update time window, based on the user location, that the user is away from the target computer location; and deciding to install the computer program update based on the update time window and the expected install duration.

BRIEF DESCRIPTION OF THE DRAWINGS

Preferred embodiments of the present invention will now be described, by way of example only, with reference to the following drawings in which:

FIG. 2 is a component diagram of a user scheduler according to an embodiment;

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for performing a computer program update on a target computer. In an embodiment, a target computer having a location, a user, a computer program, and a computer program update is determined. An expected install duration for installing the computer program update is determined. A social media service associated with the user is monitored. A user location is detected from the social media service and an update time window is estimated based on the user location and the distance that the user is away from the target computer location. A decision is made whether to install the computer program update based on the update time window and the expected install duration.

Figure 1A:
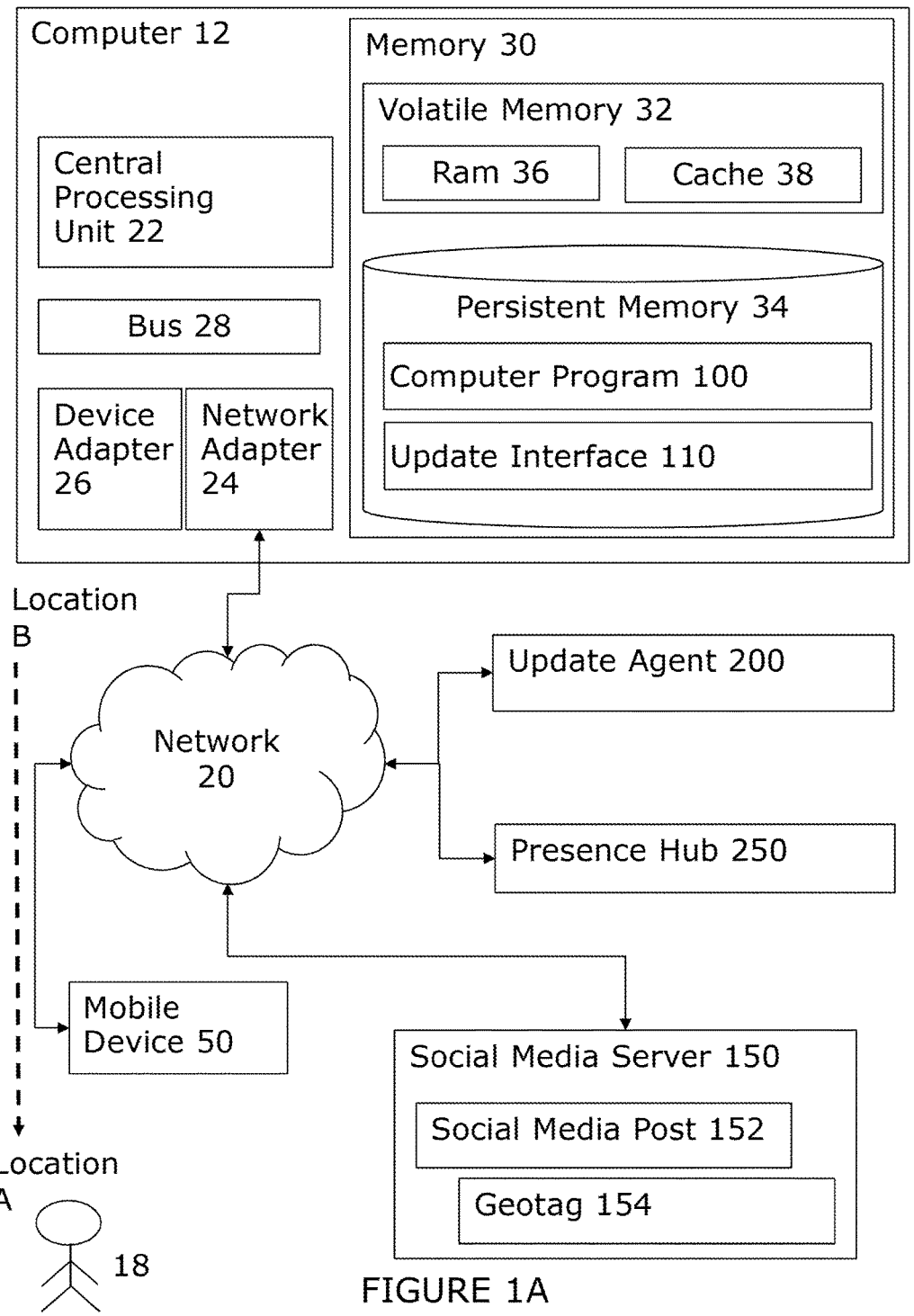
FIGS. 1A and 1B are deployment diagrams of an update system according to an embodiment and a further embodiment respectively.

Referring to FIG. 1A, the deployment of an embodiment in update system 10 is described. Update system 10 is operational with numerous other general purpose or special purpose computing system environments or configurations. Examples of well-known computing processing systems, environments, and/or configurations that may be suitable for use with update system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment, for example, where a computer processing system is a third-party service performed by one or more of a plurality computer processing systems. A distributed computer environment also includes an Internet of Things computing environment, for example, where computer processing systems are distributed as a network of objects that can interact with a computing service.

Update system 10 may be described in the general context of computer system executable instructions, such as program modules, being executed by a computer processor. Generally, program modules may include: routines; programs; objects; components; logic; and/or data structures that perform tasks and/or implement abstract data types. Update system 10 may be embodied in distributed cloud computing environments where tasks are performed by remote processing devices that are linked through a communications network. In a distributed cloud computing environment, program modules may be located in both local and remote computer system storage media including memory storage devices.

Figure 1B:
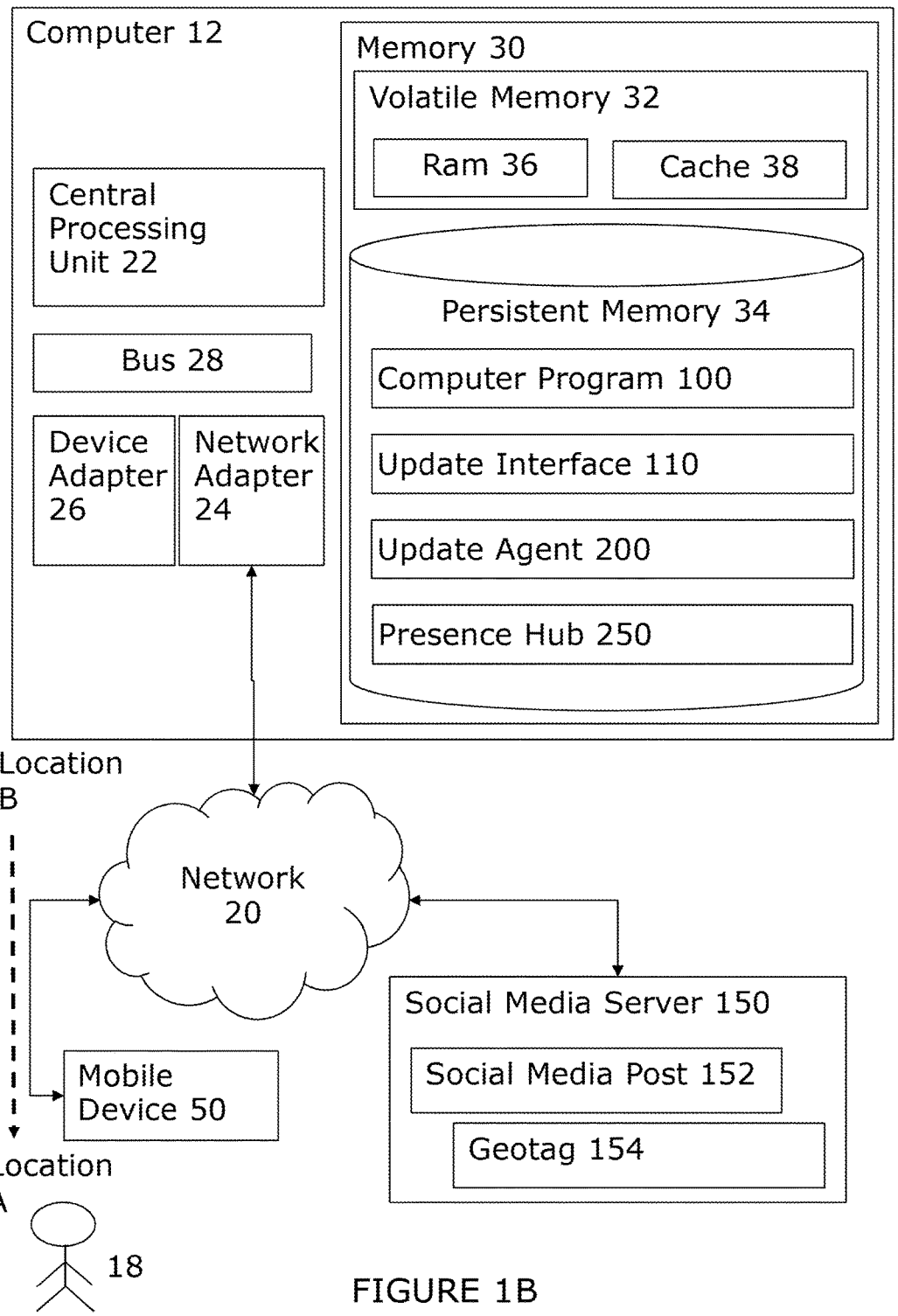

Update system 10 comprises: computer 12; network 20; mobile device 50; social media server 150; update agent 200; and presence hub 250. In the preferred embodiment, computer 12, mobile device 50; social media server 150; update agent 200 and presence hub 250 are all interconnected through network 20. At a point in time, mobile device 50 and user 18 are at location A and computer 12 is in location B. For the purposes of simple explanation, user 18 and mobile device 50 are movable and can move to and from location A and location B whereas computer 12 is fixed at location B. In this embodiment network 20 is a wide area network (WAN) such as the Internet. In an alternative embodiment, see FIG. 1B, update agent 200 and presence hub 250 are modules in computer 12 and executed by CPU 22.

Computer 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program; the machine instructions are written in a machine code language which is referred to as a low-level language. A computer program written in a high-level language needs to be compiled to a machine code program before it can be run. Alternatively, a machine code program such as a virtual machine or an interpreter can interpret a high-level language in terms of machine operations.

Network adapter 24 is for enabling communication between the computer 12 and network connected devices.

Device adapter 26 is for enabling communication between computer 12 and input/output devices (not shown).

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Update system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 includes a program product having modules that are configured to carry out the functions of embodiments of the invention.

Modules of the preferred embodiment comprise: computer program 100 and update interface 110. In the preferred embodiment computer program 100 and update interface 110 are loaded from the persistent memory 34, where they are stored, into volatile memory 32 for operation. In another embodiment, ROM in memory 30 stores the modules for enabling the computer server 12 to function as a special purpose computer specific to the modules. Further program modules that support the preferred embodiment but are not shown include firmware, boot strap program, operating system, and support applications. Each of the operating system; support applications; other program modules; and program data; or some combination thereof may include an implementation of a networking environment.

Computer program 100 is a general computer program for performing any function and has the purpose of requiring an update (say from version 1 to version 2).

Update interface 110 is for updating computer program 100 with an update (not shown) controlled by the update agent 200. Update interface 110, as controlled by update agent 200, can wake the target computer from sleep or hibernation for updating.

Mobile device 50 is carried by user 18 and has the ability to determine its own location (e.g., using global satellite positioning).

Social media server 150 is a third party service that collects a social media post 152 with an optional geotag 154. Typically, user 18 will create a post on mobile device 50 and send the social media post 152 to social media server 150. Optionally mobile device 50 attaches a geotag 154 to social media post 152. Geotag 154 comprises metadata of the mobile device 50's position in world. In the preferred embodiment, any other device could make a social media post 152 including positional information other than a geotag.

Presence hub 250 is configured to monitor location services associated with the user and refine the user location detected from the social media service. Such location services would include a global satellite positioning service and a mobile phone network positioning service directly linked to the phone. Presence hub 250 is also configured to confirm a user position using other data services including a direct positioning service from the user's mobile device.

Update system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that, although not shown, other hardware and/or software components could be used in conjunction with update system 10. Examples include, but are not limited to: microcode, device drivers, redundant processing units, external disk drive arrays, redundant array of independent disks (RAID), tape drives, and data archival storage systems.

Referring to FIG. 2, update agent 200 determines when to apply an update to the computer program 100 and comprises: target computer engine 206; install duration engine 208; social media engine 210; update window engine 212; installation engine 214; and computer program update method 300.

Target computer engine 206 determines a target computer having a location (for example location B), a user (for example user 18), a computer program (for example computer program 100) and a computer program update.

Install duration engine 208 determines an expected install duration for installing the computer program update.

Social media engine 210 monitors a social media service associated with the user and detects a user location from a social media post on the social media service. Detecting a user location from the social media service comprises deducing a location from a user post and/or locating a geotag associated with the user post. Deducing a user location from a user post also comprises identifying a location in the text of the user post by matching a location label in the user post with a known location address associated with the user. Identifying a location comprises matching a location label in the user post to a location address in an address database.

Update window engine 212 is configured to estimate an update time window, based on the user location, that the user is away from the target computer location. Update window engine 212 is also configured to: detect a change in user location and estimate a changed update time window, based on the change in user location, that the user could be away from the target computer. A change in user location can be detected by social media engine 210 or from presence hub 250. A social media post indicates that a user will be at a particular location. The update window engine 212 is also configured to determine a particular duration of time that the user could be away from an installation target. For instance, if the user is in a coffee shop or a takeaway restaurant then update window engine 212 can assume a relatively shorter update window (e.g., just an extra 10 mins) for ordering and collecting, however, if in a service restaurant then update window engine 212 can assume a relatively longer update window (e.g., an extra hour) for eating a full sit-down meal.

Installation engine 214 is configured to decide whether to install the computer program update based on the update time window and the expected install duration. The installation engine 214 is also configured to decide whether to back out of the installation if the changed update window is not big enough to install the computer program update or to continue to install the computer program update if the changed update time window is not big enough to back out of the computer program update installation.

Certain embodiments of the present invention may offer various technical computing advantages, including increased efficiency in the installation of software upgrades, which may not have been compatible under previous solutions. Using the teachings of this invention, software can be kept up to date without interrupting the user working on the computer device on which the software resides. This improves the operation of the computer device by ensuring the updates are performed in a timely fashion, while also increasing the productivity of the user by reducing interruptions.

The embodiments may suggest ways in which update operations that would normally interrupt a user's workflow could be postponed until when the system knows that the user will not be interrupted or inconvenienced by the upgrade.

The embodiments may use of two or more devices and third party services that the devices have access to. An example would be a user's social media accounts where a user has left the house with their mobile phone, and the laptop has updates to apply. The embodiments watch for any status changes that indicate there is enough time to apply a software update before the user returns, then go ahead and apply them when that is the case.

One feature of the embodiments and a geofencing solution may include a social media post that indicates that a user will be at a particular location for a particular duration of time, which then can be factored into the total time away from an installation target.

Computer program update method 300 performs the embodiment using the update agent 200 and is described in more detail below.

Figure 3A:
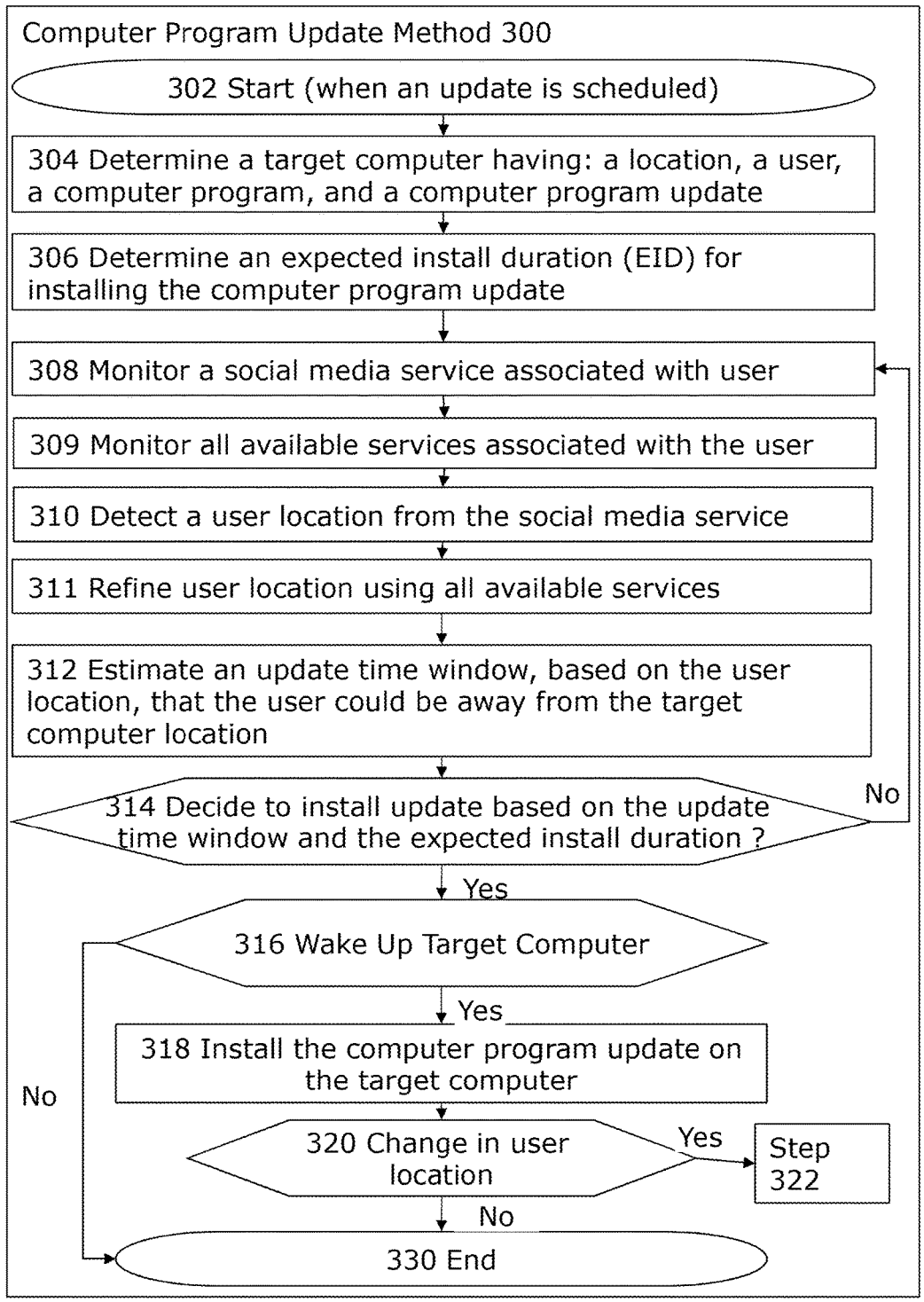
FIGS. 3A and 3B are a flow diagram of a computer program update method according to an embodiment.
Figure 3B:
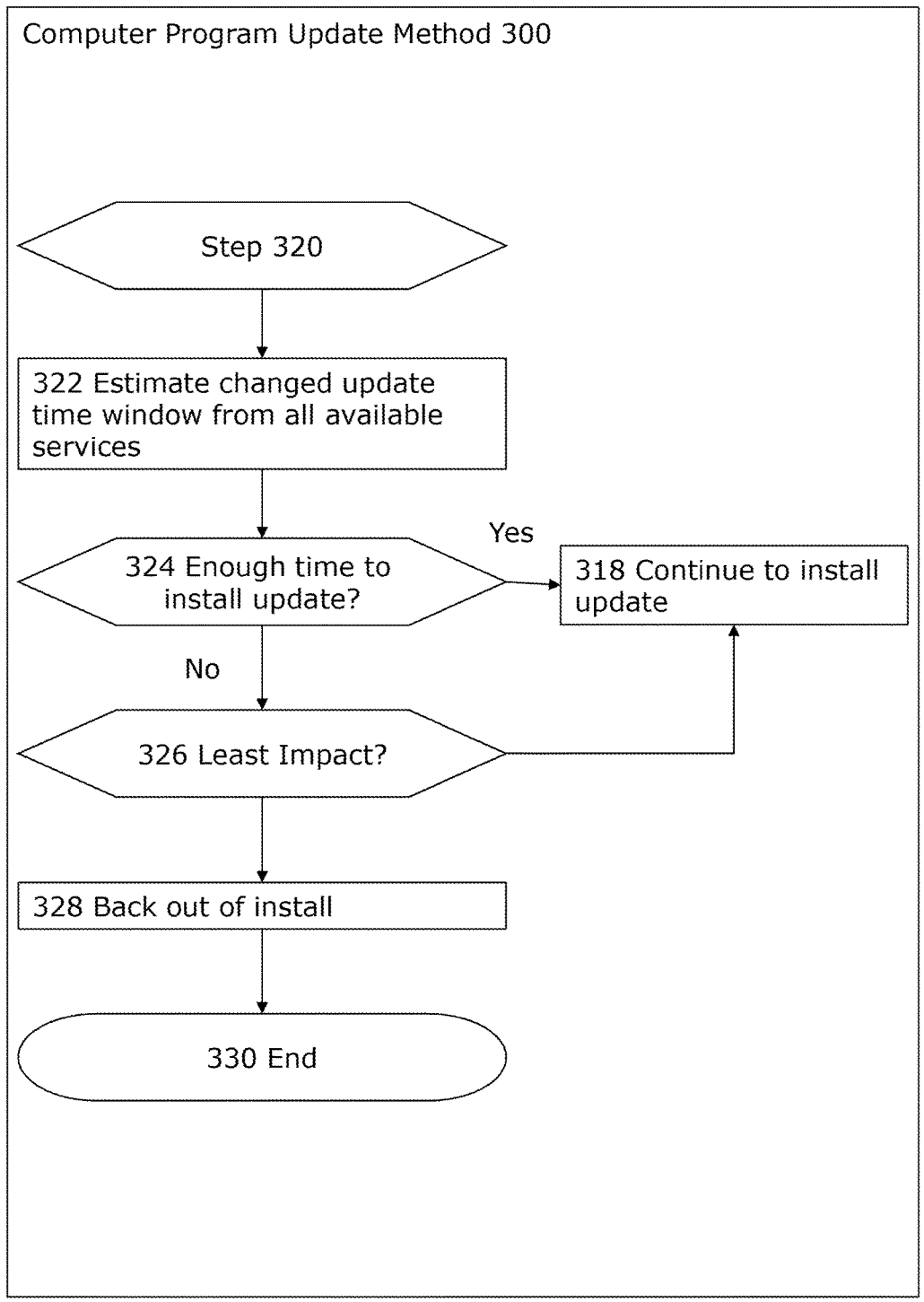

Referring to FIG. 3, in an embodiment computer program update method 300 comprises logical process steps 302 to 330. Although there is an order to the embodiment steps as described, the steps may not necessarily need to be in this order unless specified and in other embodiments steps can be in a different order.

Step 302 is the start of the method when an update is scheduled.

In step 304 a target computer having a location, a user; a computer program and a computer program update is determined.

In step 306 an expected install duration (EID) for installing the computer program update is determining.

In step 308 a social media service associated with the user is monitored. Step 308 can also monitor two or more social media services.

In step 309 other available location services associated with user from the presence hub 250 can be monitored. This is an optional step that can be used to improve location detection using the social media service in an embodiment.

In step 310 a user location is detected from the social media service. The estimated user location is deduced using a location from a user post, which may be associated with a geotag. A geotag comprises a standard format of absolute position and geographical location typically using latitude and longitude. Deducing a location from a user post further comprises identifying a location in the text of the user post by inferring an address from known addresses associated with the user or searching an address database using location identifier in the text.

In step 311 the user location is refined based on all other available location services. This is an optional step in association with step 309 in an embodiment.

In step 312 an update time window is estimated based on the user location. The update time window is the length of time that the user will be away from the target computer location.

In step 314 a decision is made whether to install the computer program update based on the update time window and the expected install duration. In an embodiment, the decision made is to install if the update time window is bigger by a threshold amount of time than the expected install duration. However, in other embodiments the update time window might be smaller than the expected install duration by a threshold amount, for instance when it is deemed acceptable for a user to wait for a limited amount of time for a big install to finish.

In step 316 the target computer is awakened from sleep or hibernation if necessary to start the install.

In step 318 the computer program update is installed on the computer system.

Step 320 detects whether a change in user location has occurred and, if so, estimates a changed update time window. If there is no change in the user's location, then step 330.

Step 322 estimates the changed update time window from all from social media services and/or from the presence hub.

Step 324 recalculates whether there is enough time to install the update and if so continues to install at step 318. Otherwise flow proceeds to step 326.

In step 326 a determination is made as to which process will have the least impact on the user: continuing to install; or backing out of install. For instance, backing out of an installation can take a significant amount of time and might be longer than the time required to finish the installation. Step 326 can decide to continue with installation at 318 or to back out at step 328.

Step 328 backs out of the installation.

Step 330 is the end of computer program update method 300.

Examples of how the embodiment can be used are described below.

In all examples, computer 12 is a laptop and device 50 is a phone, both connected to the same social media account. The laptop has an update to apply that will take it down for at least 10 minutes. In the example embodiment, an evaluation that user 18 will be away for at least 10 minutes must be made before it applies the update.

Update system 10 is started in response to a scheduling of a computer program update for a computer program on the user's laptop.

In a first example, user 18 is seated at laptop 12. The laptop 12 and phone 50 assume that they are near each other because there is no indication otherwise. For example, they can see each other on the same wireless network so the update is not applied.

In a second example, the user gets up and locks their screen whilst taking a break and taking their phone with them. The update is not applied because there is no indication that the computer and phone are at different locations.

In a third example, the user takes a short break. This means the phone drops off the same network as the laptop, but only for a minute or two. The laptop has no way to predict how long the user will be away for, so does not choose to apply the update at this point.

In a fourth example, the user goes out for half an hour and the connection between the two devices drops. The update is not installed because there is no way of knowing when the use will return even though the user was away for a prolonged period.

In a fifth example, the user travels from his office at location B to location A, a nearby restaurant 15 mins drive away for a meal.

Figure 4:
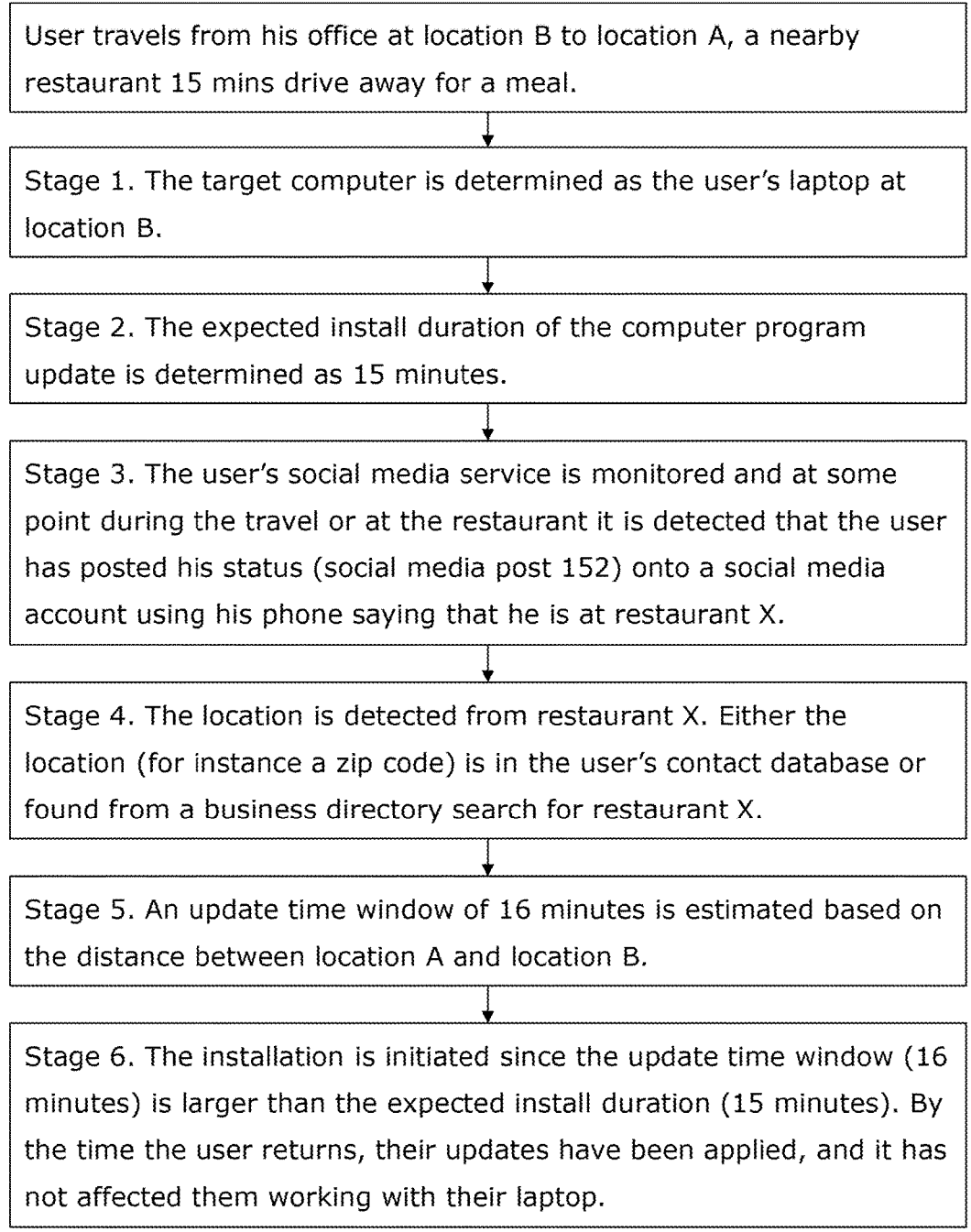
FIG. 4 is an example social media post being processed according to an embodiment.

Referring to FIG. 4, the fifth example comprises stages 1 to 6.

Stage 1. The target computer is determined as the user's laptop. The location of the laptop is determined as location B. The user is determined as the owner of the laptop, the mobile device and a social media account.

Stage 2. The expected install duration of the computer program update is determined as 15 minutes.

Stage 3. The user's social media service is monitored and at some point during the travel or at the restaurant it is detected that the user has posted his status (social media post 152) onto a social media account using his phone saying that he is at restaurant X.

Stage 4. The location is detected from restaurant X. Either the location (for instance a zip code) is in the user's contact database or found from a business directory search for restaurant X.

Stage 5. An update time window of 16 minutes is estimated based on the distance between location A and location B.

Stage 6. The installation is initiated since the update time window (16 minutes) is larger than the expected install duration (15 minutes). By the time the user returns, the updates have been applied, and the process has not affected the user working with the laptop.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital video disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein, with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function act specified in the flowchart and/or block diagram block or blocks.

The computer readable program instructions may also be loaded on to a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A system for performing a computer program update on a target computer comprising:
    a memory comprising instructions;
    a bus coupled to the memory; and
    a processor coupled to the bus that when executing the instructions causes the system to:
        determine a target computer having a location, a user, a computer program, and a computer program update;
        determine an expected install duration for installing the computer program update;
        monitor a social media service associated with the user and for detecting a user location from a social media post on the social media service;
        estimate an update time window, based on the user location, that the user is away from the target computer location; and
        beginning an installation of the computer program update based on the update time window and the expected install duration;
        detect a change in user location;
        estimate a changed update time window, based on the change in user location, that the user could be away from the target computer; and
        back out of the installation if the changed update window is not big enough to install the computer program update.

2. The system according to claim 1, wherein the executing the instructions further causes the system to monitor further location services associated with the user and refine the user location detected from the social media service.

3. The system according to claim 1, wherein the executing the instructions further causes the system to continue to install the computer program update if the changed update time window is not big enough to back out of the computer program update installation.

4. The system according to claim 1, wherein a change in user location can be detected by a social media engine from the social media service or from a presence hub of a further location service.

5. The system according to claim 1, wherein detecting a user location from the social media service comprises deducing a location from a user post and locating a geotag associated with the user post.

6. The system according to claim 1, wherein detecting a user location from a user post comprises identifying a location from text of the user post.

7. The system according to claim 6 wherein identifying a location from the text of a user post comprises matching a location label in the user post with at least one of: a known location address associated with the user or a location address in a general address database.

8. The system according to claim 1, wherein the executing the instructions further causes the system to estimate a duration time the user stays at the location depending on the location.

9. The system according to claim 1, wherein the executing the instructions further causes the system to wake the target computer from sleep or hibernation.

10. A method for performing a computer program update on a target computer comprising:
    determining a target computer having a location, a user, a computer program, and a computer program update;
    determining an expected install duration for installing the computer program update;
    monitoring a social media service associated with the user;
    detecting a user location from the social media service;
    estimating an update time window, based on the user location, that the user is away from the target computer location;
    beginning an installation of the computer program update based on the update time window and the expected install duration;
    detecting a change in user location;
    estimating a changed update time window, based on the change in user location, that the user could be away from the target computer; and
    backing out of the installation if the changed update window is not big enough to install the computer program update.

11. The method according to claim 10 further comprising monitoring further location services associated with the user and refining the user location detected from the social media service.

12. The method according to claim 10, further comprising continuing to install the computer program update if the changed update time window is not big enough to back out of the computer program update installation.

13. The method according to claim 10, wherein a change in user location can be detected from the social media service or from a further location service.

14. The method according to claim 10 wherein detecting a user location from the social media service comprises deducing a location from a user post.

15. The method according to claim 14 wherein deducing a location from a user post comprises locating a geotag associated with the user post or identifying a location in the text of the user post.

16. The method according to claim 14 wherein deducing a location from a user post comprises inferring an address from known addresses associated with the user and/or searching an address database using location identifier in the text.

17. The method according to claim 10 further comprising waking the target computer from sleep or hibernation.

18. A computer code product for performing a computer program update on a target computer, said computer code product stored on a computer readable storage medium and loadable into the internal memory of a digital computer, comprising software code portions, which, when said computer code product is run on a computer processor, performs a method, comprising:
    determining a target computer having a location, a user, a computer program, and a computer program update;
    determining an expected install duration for installing the computer program update;
    monitoring a social media service associated with the user;
    detecting a user location from the social media service;
    estimating an update time window, based on the user location, that the user is away from the target computer location;

beginning an installation of the computer program update based on the update time window and the expected install duration;
detecting a change in user location;
estimating a changed update time window, based on the change in user location, that the user could be away from the target computer; and
backing out of the installation if the changed update window is not big enough to install the computer program update.

* * * * *